(12) United States Patent
Goto et al.

(10) Patent No.: US 6,420,286 B1
(45) Date of Patent: Jul. 16, 2002

(54) GLASS-CERAMICS

(75) Inventors: Naoyuki Goto, Machida; Junko Ishioka; Yasuyuki Kawashima, both of Sagamihara, all of (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/593,551

(22) Filed: Jun. 14, 2000

Related U.S. Application Data

(63) Continuation-in-part of application No. 09/267,743, filed on Mar. 15, 1999, now Pat. No. 6,174,827.

(30) Foreign Application Priority Data

| Mar. 23, 1998 | (JP) | 10-94020 |
| Apr. 20, 1998 | (JP) | 10-125316 |
| Dec. 10, 1998 | (JP) | 10-351682 |

(51) Int. Cl.[7] .................... C03C 10/04; C03C 10/14
(52) U.S. Cl. .................... 501/4; 501/5; 65/33.8; 428/427; 428/432
(58) Field of Search .................. 501/4, 5; 428/427, 428/432

(56) References Cited

U.S. PATENT DOCUMENTS 6,174,827 B1 * 1/2001 Goto et al. ............... 501/4

* cited by examiner

*Primary Examiner*—Karl Group
(74) *Attorney, Agent, or Firm*—Hedman & Costigan, P.C.

(57) ABSTRACT

A glass-ceramic suitable for use as a light filter includes, as a predominant crystal phase, lithium disilicate ($Li_2O.2SiO_2$) or a combination of lithium disilicate and at least one crystal phase selected from the group consisting of α-quartz (α-$SiO_2$), α-quartz solid solution (α-$SiO_2$ solid solution), α-cristobalite (α-$SiO_2$) and α-cristobalite solid solution (α-$SiO_2$ solid solution). This substrate has Young's modulus (GPa)/specific gravity of 37 or over, surface roughness Ra (arithmetic mean roughness) of 5.0 Å or below, a coefficient of thermal expansion within a temperature range from −50° C. to +70° C. which ranges from +65×$10^{-7}$/° C. to +130×$10^{-7}$/° C. and bending strength of 400 MPa or over.

15 Claims, 3 Drawing Sheets

GLASS-CERAMICS

This application is a continuation-in-part of Ser. No. 09/267,743, filed Mar. 15, 1999, now U.S. Pat. No. 6,174,827, which claims priority to Japanese Applications Serial No. 94020/1998 filed Mar. 23, 1998; Serial No. 125316/1998 filed Apr. 20, 1998 and Serial No. 351682/1998 filed Dec. 10, 1998.

BACKGROUND OF THE INVENTION

This invention relates to novel glass-ceramics and, more particularly, to glass-ceramics suitable for use as a light filter and, more particularly, to glass-ceramics suitable for use as a band-pass filter and a gain flattening filter. The invention relates also to a light filter using such glass-ceramics.

There are light filters which cut or pass light of a specific wavelength and there are also light filters which reduce intensity of light without depending upon wavelength. The former includes a band-pass filter which passes only a specific wavelength, a notch pass filter which cuts a specific wavelength and high-pass and low-pass filters which pass only wavelengths shorter or longer than a specific wavelength. The latter includes an ND filter.

Light filters can be classified also into an absorption type filter and an interference type filter. A representative absorption type filter is the ND filter and a representative interference type filter is the band-pass filter. A substrate made of plastic is used for absorption type filters such as those for photography. Since a substrate for light filters which are subject to a strong laser beam requires durability and heat resistance property, amorphous glass is exclusively employed for such substrate.

The band-pass filters are made by forming, on a substrate made of, e.g., glass, a multi-layer film of dielectric by alternately laminating an H layer of a dielectric thin film having a high refractive index and an L layer of a dielectric thin film having a low refractive index.

In a band-pass filter which is used for the WDM (wavelength division multiplexing) optical communication system, temperature stability of the center wavelength of the band poses a problem when a narrow band width for passing wavelengths is set for applying the band-pass filter to a wavelength of a higher density. More specifically, the band-pass filter is a sensitive element in which the center wavelength of the band varies even with a slight variation in temperature and, therefore, temperature compensation should be made by a temperature controller when the band-pass filter is used. Such temperature controller, however, cannot actually be employed because of limitation in the space where the band-pass filter is located. The temperature stability has become a matter of increasing importance since it is necessary to reduce the band width as the amount of light information increases.

In the past, amorphous glass has been used as a substrate for the band-pass filter. This prior art substrate is not sufficient in its compressive stress to the film and its durability since its thermal expansion property and mechanical strength are not sufficiently high. Further, amorphous glass has low mechanical strength and therefore tends to produce micro-cracks in processing with resulting cracking or chipping off of corner portions of the product which reduces the yield of the product. Moreover, in amorphous glass, a relatively large amount of alkali ingredient must be added if a high thermal expansion property is to be provided and this poses a problem of elution of alkali ingredient during and after forming of the dielectric film on the substrate. Thus, amorphous glass cannot sufficiently satisfy the demands for a substrate for a light filter, particularly a substrate for a band-pass filter.

For example, the glass-ceramics of a $SiO_2$—$Li_2O$—$MgO$—$P_2O_5$ system disclosed in U.S. Pat. No. 5,626,935 containing lithium disilicate ($Li_2O.2SiO_2$) and $\alpha$-quartz ($\alpha$-$SiO_2$) as main crystal phases and the size of the $\alpha$-quartz globular grains is controlled. No discussion, however, is made in this patent about optimum values of crystal grain diameter, degree of crystallization and mechanical strength including Young's modulus and specific gravity which are suitable for use as a light filter.

Japanese Patent Application Laid-open Publication No. Hei 10-45426 discloses a $SiO_2$—$Li_2O$—$K_2O$—$MgO$—$ZnO$—$P_2O_5$—$Al_2O_3$ system glass-ceramic or a $SiO_2$—$Li_2O$—$K_2O$—$MgO$—$ZnO$—$P_2O_5$—$Al_2O_3$—$ZrO_2$ system glass-ceramic suitable for laser texturing which contains, as its predominant crystal phase or phases, at least one of lithium disilicate ($Li_2O.2SiO_2$), a mixed crystal of lithium disilicate and $\alpha$-quartz ($\alpha$-$SiO_2$), and a mixed crystal of lithium disilicate and $\alpha$-cristobalite ($\alpha$-$SiO_2$). However, no discussion has been made in the prior art publication about optimum values of crystal grain diameter, degree of crystallization, and mechanical strength including Young's modulus and specific gravity which are suitable for use as a light filter.

Japanese Patent Application Laid-open Publication No. Hei 9-35234 discloses a magnetic disk substrate made of a glass-ceramic of a $SiO_2$—$Al_2O_3$—$Li_2O$ system having predominant crystal phases of lithium disilicate ($Li_2O.2SiO_2$) and $\beta$-spodumene ($Li_2O.Al_2O_3.4SiO_2$). This glass-ceramic, however, contains, as its predominant crystal phase, $\beta$-spodumene which has a negative thermal expansion characteristic which causes the substrate to have a negative thermal expansion characteristic and, in this glass-ceramic, growth of $SiO_2$ crystals such as $\alpha$-quartz ($\alpha$-$SiO_2$) and $\alpha$-cristobalite ($\alpha$-$SiO_2$) which have a positive thermal expansion characteristic and thereby cause the substrate to have a positive thermal expansion characteristic is extremely restricted. It is difficult in this prior art glass-ceramic to obtain a coefficient of thermal expansion required in the present invention. Besides, since this glass-ceramic is so hard that excellent processability cannot be obtained. Further, since this glass-ceramic requires a high temperature of 820° C. to 920° C. for crystallization which prevents a large scale production of the product at a competitive cost. Furthermore, no discussion has been made in the publication as to crystal grain diameter, degree of crystallization and mechanical strength.

International Publication WO97/01164 which includes the above described Japanese Patent Application Laid-open Publication No. Hei 9-35234 discloses a glass-ceramic for a magnetic disk in which temperature for crystallization is reduced (680° C.–770° C.). A sufficient improvement however cannot be achieved in this substrate. Besides, crystals grown in all examples disclosed are $\beta$-eucryptite ($Li_2O.Al_2O_3.2SiO_2$) which has a negative thermal expansion characteristic. Further, no discussion has been made in this publication as to crystal grain diameter, degree of crystallization and mechanical strength so that this glass-ceramic has the same disadvantages as the aforementioned prior art glass-ceramics.

It is, therefore, an object of the invention to provide a material suitable for a substrate for a light filter which has eliminated the above described disadvantages of the prior art substrate and has a thermal expansion property which is sufficient for avoiding variation in the refractive index at a temperature at which a filter formed with a mono-layer or multilayer film is used (i.e., having a high coefficient of thermal expansion and thereby imparting compressive stress to the film to improve temperature stability of the refractive index of the film) and also has a mechanical property which imparts sufficient durability to the filter and further has excellent light transmittance.

SUMMARY OF THE INVENTION

Accumulated studies and experiments made by the inventors of the present invention for achieving the above described objects of the invention have resulted in the finding, which has led to the present invention, that a glass-ceramic which is obtained by heat treating within a limited range a $SiO_2$—$Li_2O$—$K_2O$—$MgO$—$ZnO$—$P_2O_5$—$Al_2O_3$—$ZrO_2$ system glass contains, as its predominant crystal phase or phases, lithium disilicate ($Li_2O.2SiO_2$) or a combination of lithium disilicate and at least one crystal phase selected from the group consisting of α-quartz (α-$SiO_2$), α-quartz solid solution (α-SiO, solid solution), α-cristobalite (α-$SiO_2$) and α-cristobalite solid solution (α-$SiO_2$ solid solution), has crystal grains of the predominant crystal phase or phases having a specific range of grain diameter, and has specific mechanical properties including a coefficient of thermal expansion, Young's modulus and specific gravity which are suitable for use as a light filter, more particularly, as a band-pass filter or a gain flattening filter.

For achieving the above described object of the invention, there is provided a glass-ceramic comprising, as a predominant crystal phase, lithium disilicate ($Li_2O.2SiO_2$) having a crystal grain diameter (average) of 0.05 μm or below.

In another aspect of the invention, degree of crystallization of the lithium disilicate crystal phase is within a range from 3% to 20%.

In one aspect of the invention, the glass-ceramic has Young's modulus (GPa)/specific gravity of 37 or over.

In another aspect of the invention, the glass-ceramic comprises further at least one crystal phase selected from the group consisting of α-quartz (α-$SiO_2$), and α-quartz solid solution (α-$SiO_2$ solid solution), degree of crystallization of the α-quartz (α-$SiO_2$) and the α-quartz solid solution (α-$SiO_2$ solid solution) being within a range from 5% to 25% and a crystal grain diameter thereof (average) being 0.10 μm or below.

In another aspect of the invention, the glass-ceramic comprises further at least one crystal phase selected from the group consisting of α-cristobalite (α-$SiO_2$) and α-cristobalite solid solution (α-$SiO_2$ solid solution), degree of crystallization of the α-cristobalite (α-$SiO_2$) and the α-cristobalite solid solution (α-$SiO_2$ solid solution) being within a range from 2% to 10% and a crystal grain diameter thereof (average) being 0.10 μm or below.

In another aspect of the invention, the glass-ceramic comprises, as predominant crystal phases, lithium disilicate ($Li_2O.2SiO_2$) and at least one crystal phase selected from the group consisting of α-quartz (α-$SiO_2$), α-quartz solid solution (α-$SiO_2$ solid solution), α-cristobalite (α-$SiO_2$) and α-cristobalite solid solution (α-$SiO_2$ solid solution).

In another aspect of the invention, crystal grains of the predominant crystal phase or phases are fine and substantially of a globular shape.

In another aspect of the invention, the glass-ceramic is substantially free of $Na_2O$ and PbO.

In another aspect of the invention, the glass-ceramic has a surface roughness Ra (arithmetic mean roughness) after polishing of 5.0 Å or below.

In another aspect of the invention, the glass-ceramic has a coefficient of thermal expansion within a range from +65×10$^{-7}$/° C. to +130×10$^{-7}$/° C. in a temperature range from −50° C. to +70° C.

In another aspect of the invention, the glass-ceramic substrate has bending strength of 400 MPa or over.

In another aspect of the invention, the glass-ceramic has a composition which comprises in weight percent:

| | |
|---|---|
| $SiO_2$ | 70–77% |
| $Li_2O$ | 8–12% |
| $K_2O$ | 1–3% |
| MgO | 0–2% |
| ZnO | 0–2% |
| $P_2O_5$ | 1.5–3% |
| $ZrO_2$ | 2–7% |
| $Al_2O_3$ | 3–9% |
| $Sb_2O_3 + As_2O_3$ | 0–2%. |

In another aspect of the invention, the glass-ceramic is obtained by heat treating a base glass for nucleation under a temperature within a range from 500° C. to 600° C. for one to seven hours and further heat treating the glass for crystallization under a temperature within a range from 700° C. to 780° C. for one to twelve hours.

In another aspect of the invention, there is provided a glass-ceramic substrate for a light filter using the glass-ceramic described above.

In still another aspect of the invention, there is provided a light filter provided by forming a multi-layer film on the glass-ceramic described above.

BRIEF DESCRIPTION OF THE DRAWINGS

In the accompanying drawings.

DETAILED DESCRIPTION OF THE INVENTION

Figure 1:
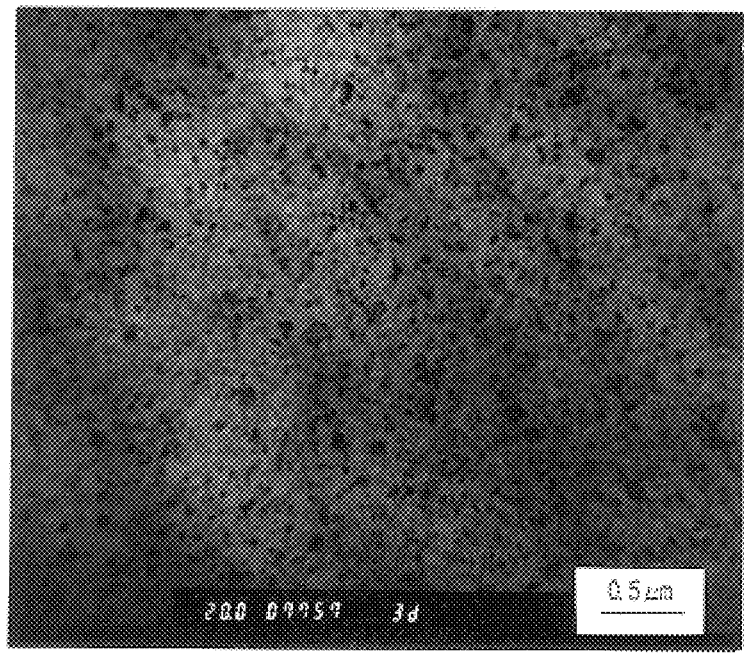
FIG. 1 is a transmission electron microscope (TEM) photograph (20,000 magnifications) of the glass-ceramic of Example 3.

Reasons for limiting the predominant crystal phases, crystal grain diameter, degree of crystallization, Young's modulus, specific gravity, mechanical strength, coefficient of thermal expansion, surface characteristics, composition and conditions of heat treatment will now be described. The composition of the glass-ceramic is expressed in weight percent on the basis of composition of oxides as in their base glass.

Description will be made first about predominant crystal phases and crystal grain diameter.

The glass-ceramic made according to the present invention comprises lithium disilicate ($Li_2O.2SiO_2$) as a predominant crystal phase having a preferable crystal grain diameter (average) of 0.05 μm or below. By reducing the crystal grain diameter of lithium disilicate to an extremely small one of 0.05 μm or below, a glass-ceramic for a light filter, particularly a light filter provided by forming a multi-layer film on the glass-ceramic, having an excellent mechanical property, particularly bending strength can be provided. By selecting lithium disilicate as a predominant crystal phase, a glass-ceramic having excellent chemical durability and physical property can be provided. A preferable range of crystal grain diameter (average) of lithium disilicate is less than 0.05 μm and a more preferable range thereof is less than 0.04 μm.

The degree of crystallization of the lithium disilicate crystal phase should preferably be 3% or over in view of the fact that, by this degree of crystallization, the effect of preventing occurrence of micro-cracks can be significantly achieved and that it is a predominant crystal phase. The degree of crystallization of this crystal phase should preferably be 20% or below because it will be easy to design a substrate having proper properties of the invention (i.e., coefficient of thermal expansion, Young's modulus, specific gravity and surface roughness) within this range of degree of crystallization.

The glass-ceramic substrate should preferably contain, as a predominant crystal phase in addition to lithium disilicate, at least one of α-quartz (α-$SiO_2$) and α-quartz solid solution (α-$SiO_2$ solid solution). By containing this crystal phase as an additional predominant crystal phase, occurrence of micro-cracks can be prevented, bending strength can be increased and a coefficient of thermal expansion within a temperature range from −50° C. to +70 can be set within a higher range. For realizing these effects, the degree of crystallization of this predominant crystal phase should preferably be 5% or over and, for easily designing the glass-ceramic to a substrate having properties of the invention (particularly coefficient of thermal expansion, specific gravity and surface roughness), the degree of crystallization should preferably be 25% or below. The crystal grain diameter (average) of the predominant crystal phase should preferably be 0.10 μm or below for obtaining a substrate having an excellent super flatness by polishing and obtaining excellent mechanical strength, particularly bending strength. A preferable crystal grain diameter is 0.10 μm or below, a more preferable crystal grain diameter is below 0.09 μm and a further more preferable crystal grain diameter is 0.09 μm or below and most preferably, 0.07 μm or below.

The glass-ceramic substrate according to the invention should preferably contain, in addition to lithium disilicate, at least one of α-cristobalite (α-$SiO_2$) and α-cristobalite solid solution (α-SiO2 solid solution) as a predominant crystal phase. By containing this additional predominant crystal phase, occurrence of micro-cracks can be prevented in the same manner as in the case of containing α-quartz, bending strength can be increased remarkably and a coefficient of thermal expansion within a temperature range from −50° C. to +70° C. can be set within a higher range. For realizing these effects, the degree of crystallization of the predominant crystal phase should preferably be 2% or over and, for easily designing the glass-ceramic to a substrate having properties of the invention (particularly surface roughness and coefficient of thermal expansion), the degree of crystallization should preferably be 10% or below. The crystal grain diameter (average) of the predominant crystal phase should preferably be 0.10 μm or below for obtaining a substrate having an excellent super flatness by polishing and excellent mechanical strength, particularly bending strength. A preferable crystal grain diameter is 0.10 μm or below, a more preferable crystal grain diameter is below 0.10 μm, a further preferable crystal grain diameter is below 0.10 μm, a further more preferable crystal grain diameter is 0.09 μm or below and most preferably, 0.07 μm or below.

Description will now be made about the crystal grain diameter of the predominant crystal phases and the surface characteristics after processing. For reducing scattering of light due to flatness of the surface of a light filter to the maximum, the surface roughness Ra (arithmetic mean roughness) of the glass-ceramic after polishing should preferably be 5.0 Å or below, more preferably 3.0 Å or below and, more preferably 2.0 Å or below.

For obtaining a glass-ceramic substrate having such flatness, the shape and diameter of grown crystal grains become important factors. For workability and surface roughness of the substrate, the grown crystal grains should preferably be fine globular grains.

A glass-ceramic for a light filter, particularly a glass-ceramic for a light filter formed with a multi-layer film thereon, more particularly, a band-pass filter and a gain flattening filter, should preferably be free from defects such as crystal anisotropy, foreign matters and impurities and have a uniform, homogeneous and fine texture. These requirements are fully satisfied by the substrate of the invention which contains the above described predominant crystal phase (lithium disilicate, or a combination of lithium disilicate and at least one of α-quartz, α-quartz solid solution, α-cristobalite and α-cristobalite solid solution) having the above described crystal grain diameter and crystal grain shape.

The glass-ceramic having the above described predominant crystal phase or phases has a coefficient of thermal expansion as described below which is suited for a substrate for a light filter, particularly a glass-ceramic for a light filter formed with a multi-layer film thereon, more particularly, a band-pass filter and a gain flattening filter. The glass-ceramic substrate of the invention should preferably not contain, as a predominant crystal phase, β-spodumene, β-eucryptite, β-cristobalite (β-$SiO_2$) or β-quartz which has a negative thermal expansion characteristic.

Description will now be made about a coefficient of thermal expansion. Coefficient of thermal expansion is a very important factor for improving the wavelength resolution of the multi-layer film. More specifically, stability of center wavelength of a band against temperature is very important and, for this purpose, a coefficient of thermal expansion which is larger than that of a film forming material is required. As a result of studies and experiments made by the inventors of the present invention, it has been found that, in a band-pass filter, stability of the center wavelength against temperature depends to some extent on a refractive index temperature coefficient of a dielectric which constitutes the thin film and, to a larger extent than that, on a coefficient of thermal expansion of the substrate. This is because refractive index is also determined by a film atomic density of the thin film. That is, the higher the film atomic density of the thin film is, the smaller becomes variation caused by the temperature of the center wavelength. The film atomic density of the thin film is greatly influenced by the coefficient of thermal expansion of the substrate for the light filter on which the thin film is formed. More specifically, the temperature of the substrate during the film forming process becomes about 200° C. and the substrate thereby is considerably expanded. The thin film is formed on this expanded substrate and, as the substrate is cooled, the thin film is subjected to compressive stress due to difference in the coefficient of thermal expansion between them. As a result, the film atomic density of the thin film increases and the refractive index thereby increases. As the coefficient of thermal expansion of the substrate increases, the compressive stress applied to the dielectric thin film formed on the substrate increases with the result that variation in the refractive index due to temperature at which the filter is used increases. In a region of the compressive stress above a certain value, variation of refractive index relative to change in temperature is saturated with a small value of variation. In other words, by imparting compressive stress above a certain value to the dielectric thin film, variation in the center wavelength relative to the temperature becomes constant with a small value of variation. For this reason, it is desirable to set the coefficient of thermal expansion of the glass-ceramic at a larger value than the coefficient of thermal expansion of the dielectric thin film.

It has been found that, if the coefficient of thermal expansion within the temperature range from −50° C. to +70° C. is $65\times10^{-7}$/° C. or over, sufficient compression stress can be imparted to the film with a temperature range in which the glass-ceramic is used as a band-pass filter and that, if the coefficient of thermal expansion exceeds $140\times10^{-7}$/° C., differences in the coefficient of thermal expansion between the substrate and the filter becomes so large that problems such as separation of the film from the substrate take place. A preferable range of the coefficient of thermal expansion is $65\times10^{-7}$/° C. to $130\times10^{-7}$/° C., a more preferable range is $75\times10^{-7}$/° C. to $130\times10^{-7}$/° C. and the most preferable range is $95\times10^{-7}$/° C. to $130\times10^{-7}$/° C.

Description will be first made about Young's modulus. As described above, as a glass-ceramic used for a light filter which is formed with a multi-layer film thereon, particularly for a band-pass filter or a gain flattening filter, it is preferable for the glass-ceramic to have the Young's modulus as defined in the claims of the present application from the viewpoint of processing and various handling processes. For the use as the light filter, the glass-ceramic is processed to small chips each having a size in the order of, for example, 1 mm×1 mm×1 mm and, if Young's modulus is lower than the above defined range, micro-cracking or chipping off of corner portions of these small chips will take place in processing of the glass-ceramic to such small chips with resulting significant drop in the yield of the product. Micro-cracking or chipping off of corner portions of small chips does not take place at a significant rate in processing of the glass-ceramic of the present invention presumably by virtue of synergistic effect of a large Young's modulus and restriction of growth of micro-cracks by precipitated crystal grains of the glass-ceramic.

As regards specific gravity, the glass-ceramic should preferably have as low specific gravity as possible. In most cases where the glass-ceramic is used as a light filter, many small chips, each constituting a light filter are mounted on one unit of optical fiber. The light filter made of the glass-ceramic of the present invention has excellent stability in the center wavelength of the filter band and also has high wavelength resolution and, therefore, the unit of optical fiber can receive many wavelengths of light. Accordingly, it is important to reduce the weight of the unit and, for this purpose, specific gravity of the glass-ceramic must be taken into consideration. If, however, the specific gravity of the glass-ceramic is reduced to an excessive degree, it becomes difficult to achieve a desired Young's modulus by reason of balance of ratio between precipitated crystal phases and ratio of precipitation of crystal phases in the glass-ceramics. Having regard to such balance, it has been found that the specific gravity should preferably be within a range from 2.4 to 2.6. Having further regard to this balance, it has been found that Young's modulus (GPa)/specific gravity should preferably be 37 or over and 50 or below.

Having regard to occurrence of micro-cracks and chipping off during processing, the glass-ceramic should preferably have bending strength of 400 MPa or over and, more preferably 450 MPa or over. In examples of the invention, the substrate has bending strength within a range from 400 MPa to 800 MPa.

Reasons for limiting the composition range of the base glass as defined in the claims will now be described.

The $SiO_2$ ingredient is a very important ingredient for growing lithium disilicate ($Li_2O.2SiO_2$), α-quartz (α-$SiO_2$), α-quartz solid solution (α-$SiO_2$ solid solution, α-cristobalite (α-$SiO_2$) and α-cristobalite solid solution (α-$SiO_2$ solid solution) as predominant crystal phases by heat treating the base glass. If the amount of this ingredient is below 70%, grown crystals of the glass-ceramic becomes instable and its texture tends to become coarse. If the amount of this ingredient exceeds 77%, difficulty arises in melting and forming of the glass.

The $Li_2O$ ingredient is a very important ingredient for growing lithium disilicate ($Li_2O.2SiO_2$) as a predominant crystal phase by heat treating the base glass. If the amount of this ingredient is below 8%, difficulty arises in growing of this crystal phase and also in melting of the base glass. If the amount of this ingredient exceeds 12%, the grown crystal is instable and its texture tends to become coarse and its chemical durability is deteriorated.

The $K_2O$ ingredient improves the melting property of the glass and prevents the grown crystal from becoming too coarse. Since an excessive amount of this ingredient causes coarseness of the grown crystal, change in the crystal phase and deterioration in chemical durability, the amount of up to 3% of this ingredient will be preferable.

The MgO and ZnO ingredients are effective for improving the melting property of the glass, preventing grown crystal grains from becoming too coarse and enabling crystal grains of lithium disilicate ($Li_2O.2SiO_2$), α-quartz (α-$SiO_2$), α-quartz solid solution (α-$SiO_2$ solid solution), α-cristobalite (α-$SiO_2$) and α-cristobalite solid solution (α-$SiO_2$ solid solution) to grow in a globular shape. For these purposes, the amount of the MgO ingredient should preferably be 0.3% or over and the amount of the ZnO ingredient should preferably be 0.1% or over. If the amounts of the MgO and ZnO ingredients are excessive, the crystal obtained will be instable and its texture will become too coarse. The amount of the MgO ingredient, therefore, should preferably be 2% or below and, more preferably, 1% or below. Likewise, the amount of the ZnO ingredient should preferably be 2% or below and, more preferably, 1% or below. The total amount of the MgO and ZnO ingredients should preferably be 2% or below, preferably 1% or below.

The $P_2O_5$ ingredient is indispensable as a nucleating agent. For enhancing forming of nucleus and preventing grown crystal grains from becoming too coarse, the amount of this ingredient should preferably be 1.5% or over. For preventing opaque devitrification of the base glass and maintaining stable large scale production, the amount of this ingredient should preferably be 3% or below.

The $ZrO_2$ ingredient is an important ingredient which, in addition to the functions, like the $P_2O$ ingredient, as a nucleating agent, is effective for making the grown crystals fine, improving the mechanical strength and improving chemical durability. For achieving these effects, a preferable amount of the $ZrO_2$ ingredient is 2% or over. If an excessive amount of the $ZrO_2$ ingredient is added, difficulty arises in melting of the base glass and $ZrSiO_4$ and the like slug are left unmelted, so that a preferable amount of the $ZrO_2$ ingredient is 7% or below.

The $Al_2O_3$ ingredient is effective for improving chemical durability and mechanical strength, particularly hardness, of the glass-ceramic. A preferable amount of this ingredient is 3% or over and, more preferably, 4% or over. If an excessive amount of the $Al_2O_3$ ingredient is added, the grown crystal phase changes to β-spodumene ($Li_2O.Al_2O_3.4SiO_2$). Since growth of β-spodumene and β-cristobalite significantly decreases the coefficient of thermal expansion of the material, growth of such crystal should be avoided. For this purpose, a preferable range of this ingredient is 9% or below and, more preferably, 8% or below.

The $Sb_2O_3$ and $As_2O_3$ ingredients may be added as a refining agent in melting the base glass. Addition of these ingredients in the total amount up to 2% and, preferably up to 1%, will suffice.

The $Na_2O$ or PbO ingredient is not substantially contained in the glass-ceramic of the invention. $Na_2O$ is an ingredient which poses problems in forming of the multi-layer film. This is because Na ions diffuse in the multi-layer film to deteriorate the properties of the film. PbO is an undesirable ingredient from the viewpoint of the environment protection. Use of these ingredients, therefore, should be avoided.

For manufacturing the glass-ceramic substrate for an information storage medium according to the invention, glass materials of the above-described composition are melted and are subjected to a hot or cold forming process. The formed glass is subjected to heat treatment under a temperature within a range from 500° C. to 600° C. for one to seven hours for nucleation and then is subjected to further heat treatment under a temperature within a range from 700° C. to 780° C. for one to twelve hours for crystallization.

The glass-ceramic thus obtained by the above heat treatment contains, as a predominant crystal phase or phases, lithium disilicate ($Li_2O.2SiO_2$) or a combination of lithium disilicate and at least one crystal selected from the group consisting of α-quartz ($\alpha$-$SiO_2$), α-quartz solid solution ($\alpha$-$SiO_2$ solid solution), α-cristobalite ($\alpha$-$SiO_2$) and α-cristobalite solid solution ($\alpha$-$SiO_2$ solid solution). The degree of crystallization of lithium disilicate is within a range from 3% to 20% and its crystal grain diameter is within a range from 0.005 μm and 0.05 μm. The degree of crystallization of α-quartz and α-quartz solid solution is within a range from 5% to 25% and their crystal grain diameter is within a range from 0.01 μm to 0.10 μm. The degree of crystallization of α-cristobalite and α-cristobalite solid solution is within a range from 2% to 10% and their crystal grain diameter is within a range from 0.01 μm to 0.10 μm.

The glass-ceramic subsequently is lapped and polished in a conventional manner to provide a glass-ceramic for a light filter having a surface roughness Ra (arithmetic mean roughness) within a range from 1.0 Å to 5.0 Å. A light filter (e.g., a band-pass filter or a gain flattening filter) is provided by forming a multi-layer film (dielectric film) on this glass-ceramic.

EXAMPLES

Examples of the present invention will now be described.

Tables 1 to 5 show examples (No. 1 to No. 25) of compositions of the glass-ceramic made according to the invention together with the temperature of nucleation, temperature of crystallization, predominant crystal phases, crystal grain diameter (average), degree of crystallization, a coefficient of thermal expansion, Young's modulus (GPa), specific gravity, Young's modulus (GPa)/specific gravity, bending strength and surface roughness Ra (arithmetic mean roughness) after polishing. Table 6 shows compositions and the above properties of the prior art $Li_2O.SiO_2$ system glass-ceramics disclosed in Japanese Patent Application Laid-open Publication Sho 62-72547 (Comparative Example 1) and Japanese Patent Application Laid-open Publication Hei 9-35234 (Comparative Example 2). In Tables 1 to 6, lithium disilicate is abbreviated as "LD", α-quartz as "α-q" and α-cristobalite as "α-c" respectively.

TABLE 1

| Ingredients (weight %) | Examples | | | | |
|---|---|---|---|---|---|
| | 1 | 2 | 3 | 4 | 5 |
| $SiO_2$ | 75.3 | 75.3 | 75.3 | 75.0 | 75.0 |
| $Li_2O$ | 9.9 | 9.9 | 9.9 | 9.9 | 9.5 |
| $P_2O_5$ | 2.0 | 2.0 | 2.0 | 2.0 | 2.5 |
| $ZrO_2$ | 2.3 | 2.3 | 2.3 | 3.0 | 3.9 |
| $Al_2O_3$ | 7.0 | 7.0 | 7.0 | 7.0 | 7.0 |
| MgO | 0.8 | 0.8 | 0.8 | 0.4 | 0.0 |
| ZnO | 0.5 | 0.5 | 0.5 | 0.5 | 0.5 |
| $K_2O$ | 2.0 | 2.0 | 2.0 | 2.0 | 1.4 |
| $Sb_2O_3$ | 0.2 | 0.2 | 0.2 | 0.2 | 0.2 |
| $As_2O_3$ | 0.0 | 0.0 | 0.0 | 0.0 | 0.0 |
| PbO | | | | | |
| Nucleation temperature (° C.) | 540 | 540 | 540 | 520 | 540 |
| Nucleation time (hour) | 5 | 7 | 5 | 5 | 2 |
| Crystallization temperature (° C.) | 720 | 740 | 760 | 730 | 740 |
| Crystallization time (hour) | 3 | 4 | 3 | 6 | 4 |
| Predominant crystal phase | | | | | |
| | LD | LD | LD | LD | LD |
| Grain diameter (average, μm) | 0.005 | 0.005 | 0.020 | 0.010 | 0.020 |
| Degree of crystallization (%) | 8 | 10 | 18 | 5 | 7 |
| | — | α-q | α-q | α-q | — |
| Grain diameter (average, μm) | — | 0.010 | 0.030 | 0.010 | — |
| Degree of crystallization (%) | — | 16 | 25 | 5 | — |
| | — | — | — | — | α-c |
| Grain diameter (average, μm) | — | — | — | — | 0.010 |
| Degree of crystallization (%) | — | — | — | — | 7 |
| Coefficient of thermal expansion ($\times 10^{-7}$/° C.) (−50° C. − +70° C.) | 65 | 74 | 110 | 72 | 74 |
| Young's modulus (GPa) | 108 | 114 | 110 | 105 | 100 |
| Specific gravity | 2.45 | 2.46 | 2.47 | 2.46 | 2.47 |
| (Young's modulus (GPa)/specific gravity | 44.1 | 46.3 | 44.5 | 42.7 | 40.5 |
| Bending strength (MPa) | 580 | 700 | 650 | 460 | 760 |
| Surface roughness (Ra) (Å) | 1.0 | 1.2 | 2.0 | 1.1 | 1.7 |

TABLE 2

| Ingredients (weight %) | Examples | | | | |
|---|---|---|---|---|---|
| | 6 | 7 | 8 | 9 | 10 |
| $SiO_2$ | 76.0 | 76.0 | 70.5 | 76.7 | 76.5 |
| $Li_2O$ | 9.5 | 10.0 | 11.5 | 8.5 | 8.3 |
| $P_2O_5$ | 2.3 | 2.5 | 1.7 | 1.8 | 1.8 |
| $ZrO_2$ | 4.5 | 3.0 | 6.0 | 5.0 | 2.5 |
| $Al_2O_3$ | 6.0 | 4.5 | 8.0 | 4.5 | 7.4 |
| MgO | 0.0 | 0.9 | 0.3 | 0.5 | 0.5 |

TABLE 2-continued

| Ingredients (weight %) | Examples | | | | |
|---|---|---|---|---|---|
| | 6 | 7 | 8 | 9 | 10 |
| ZnO | 0.0 | 0.4 | 0.3 | 0.5 | 1.5 |
| $K_2O$ | 1.5 | 2.5 | 1.5 | 2.0 | 1.3 |
| $Sb_2O_3$ | 0.2 | 0.2 | 0.0 | 0.5 | 0.2 |
| $As_2O_3$ | 0.0 | 0.0 | 0.2 | 0.0 | 0.0 |
| PbO | | | | | |
| Nucleation temperature (° C.) | 540 | 560 | 510 | 590 | 570 |
| Nucleation time (hour) | 3 | 4 | 3 | 2 | 3 |
| Crystallization temperature (° C.) | 780 | 750 | 710 | 740 | 750 |
| Crystallization time (hour) | 2 | 4 | 10 | 3 | 3 |
| Predominant crystal phase | | | | | |
| | LD | LD | LD | LD | LD |
| Grain diameter (average, μm) | 0.040 | 0.040 | 0.004 | 0.050 | 0.040 |
| Degree of crystallization (%) | 18 | 8 | 12 | 10 | 6 |
| | α-q | α-q | — | α-q | α-q |
| Grain diameter (average, μm) | 0.100 | 0.040 | — | 0.010 | 0.060 |
| Degree of crystallization (%) | 23 | 16 | — | 10 | 6 |
| | α-c | — | α-c | α-c | — |
| Grain diameter (average, μm) | 0.050 | — | 0.040 | 0.020 | — |
| Degree of crystallization (%) | 9 | — | 3 | 10 | — |
| Coefficient of thermal expansion ($\times 10^{-7}/$° C.) ($-50$° C. $- +70$° C.) | 79 | 75 | 66 | 120 | 69 |
| Young's modulus (GPa) | 97 | 108 | 110 | 98 | 109 |
| Specific gravity | 2.50 | 2.48 | 2.41 | 2.47 | 2.43 |
| Young's modulus (GPa)/ specific gravity | 38.8 | 43.5 | 45.6 | 39.7 | 44.9 |
| Bending strength (MPa) | 580 | 780 | 610 | 500 | 600 |
| Surface roughness (Ra) (Å) | 2.9 | 2.1 | 1.7 | 4.8 | 2.5 |

TABLE 3

| Ingredients (weight %) | Examples | | | | |
|---|---|---|---|---|---|
| | 11 | 12 | 13 | 14 | 15 |
| $SiO_2$ | 71.5 | 72.5 | 75.7 | 72.0 | 71.0 |
| $Li_2O$ | 10.8 | 10.5 | 8.5 | 11.0 | 11.5 |
| $P_2O_5$ | 2.8 | 1.5 | 1.7 | 2.5 | 2.0 |
| $ZrO_2$ | 6.5 | 6.3 | 2.1 | 6.9 | 6.5 |
| $Al_2O_3$ | 3.8 | 3.5 | 8.5 | 3.6 | 3.2 |
| MgO | 1.5 | 1.5 | 0.0 | 0.5 | 1.1 |
| ZnO | 1.0 | 1.5 | 1.0 | 0.0 | 0.8 |
| $K_2O$ | 1.4 | 1.2 | 1.5 | 2.5 | 2.4 |
| $Sb_2O_3$ | 0.7 | 1.5 | 0.0 | 1.0 | 0.0 |
| $As_2O_3$ | 0.0 | 0.0 | 1.0 | 0.0 | 1.5 |
| PbO | | | | | |
| Nucleation temperature (° C.) | 570 | 500 | 590 | 580 | 510 |
| Nucleation time (hour) | 5 | 5 | 1 | 5 | 6 |
| Crystallization temperature (° C.) | 760 | 720 | 780 | 740 | 760 |
| Crystallization time (hour) | 2 | 4 | 1 | 3 | 2 |
| Predominant crystal phase | | | | | |
| | LD | LD | LD | LD | LD |
| Grain diameter (average, μm) | 0.030 | 0.050 | 0.050 | 0.020 | 0.010 |
| Degree of crystallization (%) | 10 | 11 | 18 | 20 | 15 |

TABLE 3-continued

| Ingredients (weight %) | Examples | | | | |
|---|---|---|---|---|---|
| | 11 | 12 | 13 | 14 | 15 |
| | α-q | — | α-q | α-q | α-q |
| Grain diameter (average, μm) | 0.030 | — | 0.050 | 0.030 | 0.020 |
| Degree of crystallization (%) | 6 | — | 20 | 10 | 15 |
| | — | α-q | α-q | — | — |
| Grain diameter (average, μm) | — | 0.050 | 0.040 | — | — |
| Degree of crystallization (%) | — | 4 | 10 | — | — |
| Coefficient of thermal expansion ($\times 10^{-7}/$° C.) ($-50$° C. $- +70$° C.) | 72 | 74 | 130 | 80 | 110 |
| Young's modulus (GPa) | 110 | 100 | 96 | 110 | 101 |
| Specific gravity | 2.44 | 2.41 | 2.48 | 2.44 | 2.43 |
| Young's modulus (GPa)/ specific gravity | 45.1 | 41.5 | 38.7 | 45.1 | 41.6 |
| Bending strength (MPa) | 650 | 520 | 420 | 650 | 500 |
| Surface roughness (Ra) (Å) | 1.8 | 3.8 | 4.5 | 2.1 | 4.1 |

TABLE 4

| Ingredients (weight %) | Examples | | | | |
|---|---|---|---|---|---|
| | 16 | 17 | 18 | 19 | 20 |
| $SiO_2$ | 73.0 | 75.5 | 74.2 | 71.0 | 72.6 |
| $Li_2O$ | 8.8 | 8.5 | 9.0 | 10.0 | 11.0 |
| $P_2O_5$ | 1.7 | 1.7 | 1.8 | 2.0 | 2.0 |
| $ZrO_2$ | 5.0 | 4.0 | 3.0 | 6.5 | 5.3 |
| $Al_2O_3$ | 8.4 | 3.8 | 7.8 | 3.5 | 3.8 |
| MgO | 0.0 | 2.0 | 1.7 | 1.1 | 1.0 |
| ZnO | 0.3 | 1.5 | 0.0 | 2.0 | 0.5 |
| $K_2O$ | 2.3 | 2.5 | 2.0 | 2.4 | 2.8 |
| $Sb_2O_3$ | 0.5 | 0.5 | 0.5 | 0.0 | 0.5 |
| $As_2O_3$ | 0.0 | 0.0 | 0.0 | 1.5 | 0.5 |
| PbO | | | | | |
| Nucleation temperature (° C.) | 540 | 540 | 560 | 540 | 550 |
| Nucleation time (hour) | 5 | 5 | 1 | 3 | 5 |
| Crystallization temperature (° C.) | 740 | 740 | 780 | 720 | 740 |
| Crystallization time (hour) | 3 | 3 | 1 | 6 | 5 |
| Predominant crystal phase | | | | | |
| | LD | LD | LD | LD | LD |
| Grain diameter (average, μm) | 0.030 | 0.040 | 0.030 | 0.020 | 0.020 |
| Degree of crystallization (%) | 6 | 8 | 12 | 18 | 8 |
| | α-q | α-q | α-q | α-q | α-q |
| Grain diameter (average, μm) | 0.020 | 0.090 | 0.040 | 0.030 | 0.010 |
| Degree of crystallization (%) | 5 | 5 | 6 | 5 | 10 |
| | — | α-c | — | α-c | — |
| Grain diameter (average, μm) | — | 0.050 | — | 0.020 | — |
| Degree of crystallization (%) | — | 6 | — | 3 | — |
| Coefficient of thermal expansion ($\times 10^{-7}/$° C.) ($-50$° C. $- +70$° C.) | 66 | 110 | 100 | 95 | 90 |
| Young's modulus (GPa) | 110 | 96 | 100 | 96 | 105 |
| Specific gravity | 2.41 | 2.44 | 2.42 | 2.44 | 2.43 |
| Young's modulus (GPa)/ specific gravity | 45.6 | 39.3 | 41.3 | 39.3 | 43.2 |
| Bending strength (MPa) | 780 | 410 | 600 | 520 | 760 |
| Surface roughness (Ra) (Å) | 2.1 | 4.9 | 3.5 | 4.0 | 2.1 |

TABLE 5

| Ingredients (weight %) | Examples | | | | |
|---|---|---|---|---|---|
| | 21 | 22 | 23 | 24 | 25 |
| $SiO_2$ | 72.0 | 76.5 | 76.5 | 73.7 | 74.4 |
| $Li_2O$ | 10.5 | 8.3 | 10.2 | 9.0 | 8.3 |
| $P_2O_5$ | 2.0 | 1.8 | 2.0 | 1.8 | 1.8 |
| $ZrO_2$ | 6.5 | 2.5 | 2.5 | 2.5 | 2.5 |
| $Al_2O_3$ | 4.0 | 5.0 | 6.0 | 8.0 | 7.0 |
| MgO | 1.1 | 0.5 | 0.5 | 0.5 | 0.5 |
| ZnO | 1.5 | 1.0 | 0.0 | 0.5 | 1.0 |
| $K_2O$ | 2.4 | 2.4 | 1.5 | 2.5 | 2.5 |
| $Sb_2O_3$ | 0.0 | 2.0 | 0.8 | 0.0 | 0.0 |
| $As_2O_3$ | 0.0 | 0.0 | 0.0 | 1.5 | 2.0 |
| PbO | | | | | |
| Nucleation temperature (° C.) | 520 | 570 | 540 | 530 | 600 |
| Nucleation time (hour) | 3 | 1 | 3 | 7 | 2 |
| Crystallization temperature (° C.) | 780 | 760 | 720 | 740 | 700 |
| Crystallization time (hour) | 1 | 2 | 8 | 3 | 10 |
| Predominant crystal phase | | | | | |
| | LD | LD | LD | LD | LD |
| Grain diameter (average, μm) | 0.050 | 0.030 | 0.010 | 0.010 | 0.005 |
| Degree of crystallization (%) | 19 | 15 | 4 | 10 | 10 |
| | α-q | α-q | α-q | α-q | — |
| Grain diameter (average, μm) | 0.030 | 0.020 | 0.010 | 0.020 | — |
| Degree of crystallization (%) | 20 | 15 | 6 | 5 | — |
| | — | — | α-c | — | α-c |
| Grain diameter (average, μm) | — | — | 0.010 | — | 0.010 |
| Degree of crystallization (%) | — | — | 5 | — | 3 |
| Coefficient of thermal expansion (×10⁻⁷/° C.) (−50° C. − +70° C.) | 110 | 100 | 68 | 80 | 70 |
| Young's modulus (GPa) | 96 | 98 | 110 | 100 | 110 |
| Specifc gravity | 2.51 | 2.44 | 2.46 | 2.43 | 2.44 |
| Young's modulus (GPa)/specific gravity | 38.2 | 40.2 | 44.7 | 41.2 | 45.1 |
| Bending strength (MPa) | 490 | 500 | 780 | 650 | 760 |
| Surface roughness (Ra) (Å) | 5.0 | 4.0 | 1.5 | 1.8 | 1.1 |

TABLE 6

| Ingredients (weight %) | Comparative Examples | |
|---|---|---|
| | 1 | 2 |
| $SiO_2$ | 74.2 | 76.1 |
| $Li_2O$ | 9.6 | 11.8 |
| $P_2O_5$ | 1.5 | 2.0 |
| $ZrO_2$ | 0.4 | |
| $Al_2O_3$ | 9.6 | 7.1 |
| MgO | | |
| ZnO | | |
| $K_2O$ | 2.4 | 2.8 |
| $Sb_2O_3$ | | 0.2 |
| $As_2O_3$ | | |
| PbO | 2.3 | |
| Nucleation temperature (° C.) | 540 | 500 |
| Nucleation time (hour) | 3 | 3 |
| Crystallization temperature (° C.) | 800 | 850 |
| Crystallization time (hour) | 2 | 3 |
| Predominant crystal phase | | |
| | LD | LD |
| Grain diameter (average, μm) | 1.50 | 0.10 |
| Degree of crystallization (%) | 45 | 48 |
| | — | β-spodumene |
| Grain diameter (average, μm) | — | 0.20 |
| Degree of crystallization (%) | — | 21 |
| | α-c | — |
| Grain diameter (average, μm) | 0.300 | — |
| Degree of crystallization (%) | 16 | — |
| Coefficient of thermal expansion (×10⁻⁷/° C.) (−50° C. − +70° C.) | 48 | 49 |
| Young's modulus (GPa) | 86 | 82 |
| Specific gravity | 2.46 | 2.55 |
| Young's modulus (GPa)/specific gravity | 35.0 | 32.2 |
| Bending strength (MPa) | 320 | 300 |
| Surface roughness (Ra) (Å) | 12 | 11 |

For manufacturing the glass-ceramics of the above described examples, materials including oxides, carbonates and nitrates are mixed and molten in conventional melting apparatus at a temperature within the range from about 1350° C. to about 1450° C. The molten glass is stirred to homogenize it and thereafter formed into a disk shape and annealed to provide a formed glass. Then, the formed glass is subjected to heat treatment to produce the crystal nucleus under a temperature within the range from 500° C. to 600° C. for about one to seven hours and then is further subjected to heat treatment for crystallization under a temperature within the range from 700° C. to 780° C. for about one to twelve hours to obtain a desired glass-ceramic. Then, this glass-ceramic is lapped with diamond pellets of 800# to 2000# for about 5 minutes to 30 minutes and then is finally polished with a cerium oxide polishing agent having grain diameter ranging from 0.02 μm to 3 μm for about 30 minutes to 60 minutes.

The crystal grain diameters (average) of the respective crystal phases were measured by a transmission electron microscope (TEM). The types of the respective crystal grains were identified by the TEM structure analysis.

The degree of crystallization of the respective crystal types was obtained by preparing a 100% crystal reference specimen for each crystal type and measuring, with an X-ray diffractometer (XRD), the degree of crystallization of each crystal type on the basis of diffraction peak area employing the internal standard method.

The coefficient of linear thermal expansion was measured according to JOGIS (Japan Optical Glass Industry Standard) 06, the Young's modulus was measured by the ultrasonic pulse technique of JIS R1602, the bending strength was measured according to JIS R1601 (bending strength at three points) and the specific gravity was measured according to JOGIS 06.

The surface roughness Ra (arithmetic mean roughness) was measured with an atomic force microscope (AFM).

Figure 2:
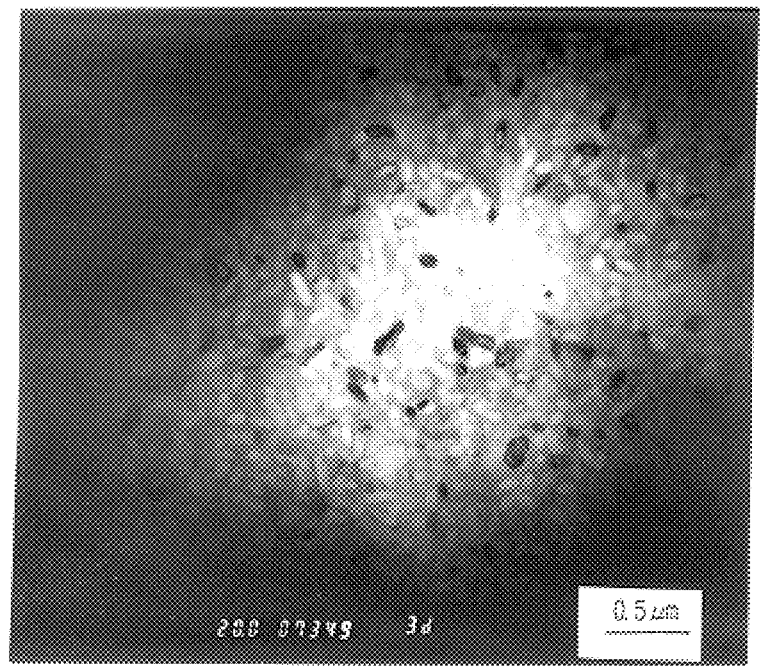
FIG. 2 is a TEM photograph (20,000 magnifications) of the glass-ceramic of Comparative Example 2.

TEM photographs showing the crystal grain shapes of Example 3 of the present invention and Comparative Example 2 are shown in FIGS. 1 and 2.

In FIG. 1, the crystal grains are all fine globular grains. The crystal grain diameter of lithium disilicate is within a range from 0.01 μm and 0.05 μm with an average crystal grain diameter of 0.02 μm. The crystal grain diameter of α-quartz is within a range from 0.02 μm to 0.05 μm with an average crystal grain diameter of 0.03 μm.

In FIG. 2, the crystal grains are all acicular or rice grain shape having a relatively large diameter. The crystal grain diameter of lithium disilicate is within a range from 0.06 μm to 0.2 μm with an average crystal grain diameter of 0.1 μm. The crystal grain diameter of β-spodumene is within a range from 0.1 μm to 0.4 μm with an average crystal grain diameter of 0.2 μm As shown in Tables 1 to 6 and FIGS. 1 and 2, the glass-ceramics of the present invention are different from the comparative examples of the prior art $Li_2O.2SiO_2$ system glass-ceramics in the crystal grain diameter (average) and degree of crystallization. In the glass-ceramics of the present invention, a predominant crystal phase or phases consists of lithium disilicate ($Li_2O.2SiO_2$) or a combination of lithium disilicate ($Li_2O.2SiO_2$) and at least one crystal phase selected from the group consisting of α-quartz (a-$SiO_2$), α-quartz solid solution (α-$SiO_2$ solid solution), α-cristobalite (α-$SiO_2$) and α-cristobalite solid solution (α-$SiO_2$ solid solution) and the crystal grains are fine globular grains whereas in the glass-ceramic of Comparative Example 1, the lithium disilicate crystal phase has a large grain diameter (average) of 1.5 μm or over and, in the glass-ceramic of Comparative Example 2, the β-spodumene crystal phase has also a large grain diameter (average) of 0.2 μm. The crystal grains of these comparative examples are all of an acicular or rice grain shape. In view of the current tendency toward the super flatness, the glass-ceramics of the comparative examples will cause difficulty in the surface roughness after polishing and cause other defects. The glass-ceramics of Comparative Examples 1 and 2 have surface roughness Ra of 11 Å and over which shows that it is extremely difficult in the comparative examples to obtain an excellent flat surface characteristic required.

Further, as regards the coefficient of thermal expansion, the glass-ceramics of the Comparative Examples 1 and 2 have a low coefficient of thermal expansion of $49 \times 10^{-7}/°$ C. or below which is quite unsuitable for a light filter, particularly as a light filter formed with a multi-layer film thereon, more particularly a band-pass filter and a gain flattening filter. Furthermore, the glass-ceramics of Comparative Examples 1 and 2 have a low Young's modulus of 86 GPa or below and a low bending strength of 320 MPa or below.

Figure 3:
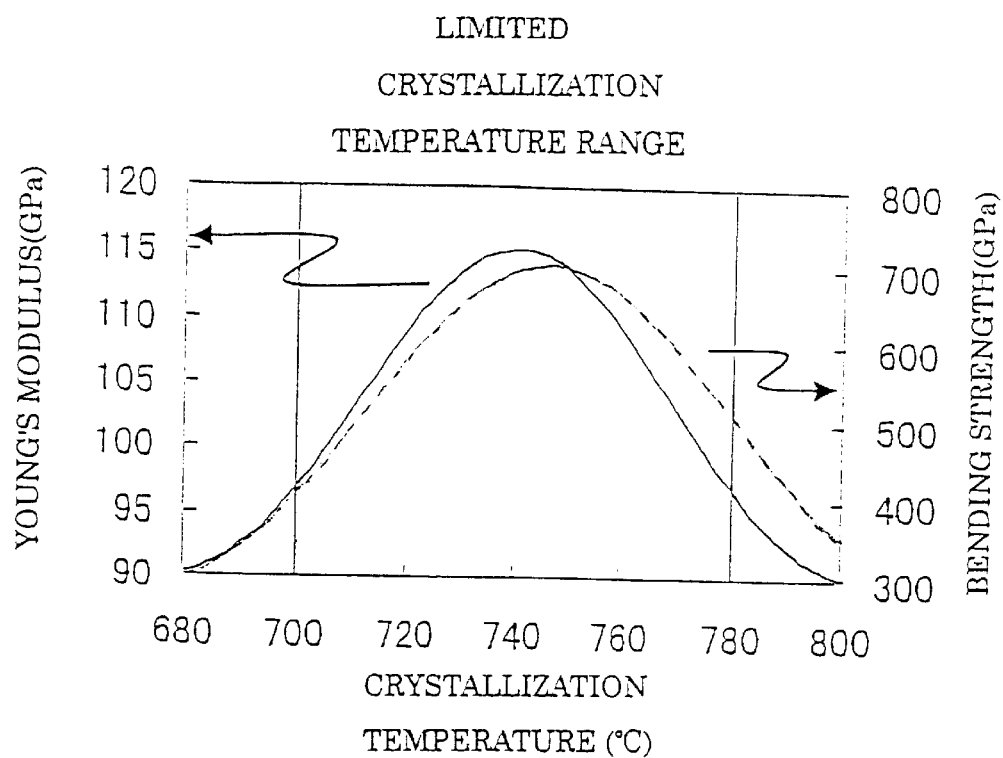
FIG. 3 is a graph showing relationship between crystallization temperature and Young's modulus and bending strength of Example 1.
Figure 4:
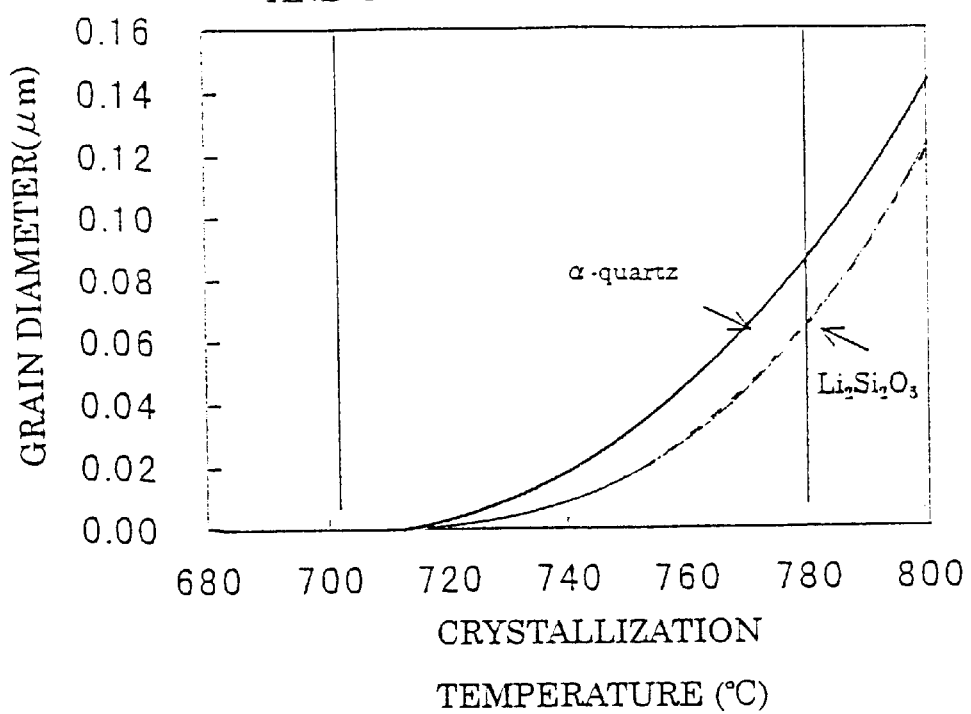
FIG. 4 is a graph showing relationship between crystallization temperature and crystal grain diameter (average) of Example 1.

Graph of FIG. 3 shows, with respect to Example 1, crystallization temperature with respect to Young's modulus and bending strength which define the present invention and graph of FIG. 4 shows, also with respect to Example 1, crystallization temperature with respect to crystal grain diameter which define the present invention. As shown in FIGS. 3 and 4, it will be apparent that the crystallization temperature exerts a great influence to the crystal grain diameter, Young's modulus and bending strength and this constitutes the basis on which the limited values in the claims are defined.

On the glass-ceramic substrates of the above described examples are formed a multi-layer film (e.g., a film of $TiO_2/SiO_2$, $Ta_2O_5/SiO_2$ and $Nb_2O_5/SiO_2$) by the sputtering method to provide a light filter. In the light filter obtained, variation in the center wavelength of transmitted light relative to temperature is significantly reduced whereby excellent wavelength resolution of the filter can be achieved.

As described in the foregoing, according to the invention, glass-ceramic substrates for a light filter having an excellent stability of a center wavelength to temperature can be provided. The features of the glass-ceramic of the invention, i.e., high light transmittance, high thermal expansion property, high Young's modulus and high bending strength, are suitable for an interference type filter, particularly a band-pass filter and are most suitable for WDM and DWDM (density wavelength division multiplexing) in optical communication systems. Further, the band-pass filter elements which are provided by forming multi-layer dielectric films of $TiO_2/SiO_2$, $Ta_2O_5/SiO_2$ and $Nb_2O_5/SiO_2$ on the glass-ceramic substrates of the invention have an excellent temperature stability of the center wavelength and can be used not only for optical communication systems on the ground but also for space-based satellites.

What is claimed is:

1. A glass-ceramic comprising, as a predominant crystal phase, lithium disilicate ($Li_2O \cdot 2SiO_2$) having a crystal grain diameter (average) of 0.05 μm or below.

2. A glass-ceramic as defined in claim 1 wherein degree of crystallization of the lithium disilicate crystal phase is within a range from 3% to 20%.

3. A glass-ceramic as defined in claim 1 wherein Young's modulus (GPa)/specific gravity is 37 or over.

4. A glass-ceramic as defined in claim 1 comprising further at least one crystal phase selected from the group consisting of α-quartz (α-$SiO_2$) and α-quartz solid solution (α-$SiO_2$ solid solution), degree of crystallization of the α-quartz (α-$SiO_2$) and the α-quartz solid solution (α-quartz solid solution) being within a range from 5% to 25% and a crystal grain diameter thereof (average) being 0.10 μm or below.

5. A glass-ceramic as defined in claim 1 comprising further at least one crystal phase selected from the group consisting of α-cristobalite (α-$SiO_2$) and α-cristobalite solid solution (α-$SiO_2$ solid solution), degree of crystallization of the α-cristobalite (α-$SiO_2$) and α-cristobalite solid solution (α-$SiO_2$ solid solution) being within a range from 2% to 10% and a crystal grain diameter thereof (average) being 0.10 μm or below.

6. A glass-ceramic as defined in claim 1 comprising, as predominant crystal phases, lithium disilicate ($Li_2O.2SiO_2$) and at least one crystal phase selected from the group consisting of α-quartz (α-$SiO_2$), α-quartz solid solution (α-$SiO_2$ solid solution), α-cristobalite (α-$SiO_2$) and α-cristobalite solid solution (α-$SiO_2$ solid solution).

7. A glass-ceramic as defined in claim 1 wherein crystal grains of the predominant crystal phase or phases are fine and substantially of a globular shape.

8. A glass-ceramic as defined in claim 1 which is substantially free of $Na_2O$ and PbO.

9. A glass-ceramic as defined in claim 1 which has a surface roughness Ra (arithmetic mean roughness) after polishing of 5.0 Å or below.

10. A glass-ceramic as defined in claim 1 which has a coefficient of thermal expansion within a range from $+65 \times 10^{-7}/°$ C. to $+130 \times 10^{-7}/°$ C. in a temperature range from $-50°$ C. to $+70°$ C.

11. A glass-ceramic as defined in claim 1 which has bending strength of 400 MPa or over.

12. A glass-ceramic as defined in claim 1 having a composition which comprises in weight percent:

| | |
|---|---|
| $SiO_2$ | 70–77% |
| $Li_2O$ | 8–12% |
| $K_2O$ | 1–3% |
| MgO | 0–2% |
| ZnO | 0–2% |
| $P_2O_5$ | 1.5–3% |
| $ZrO_2$ | 2–7% |
| $Al_2O_3$ | 3–9% |
| $Sb_2O_3 + As_2O_3$ | 0–2%. |

13. A glass-ceramic as defined in claim 1 obtained by heat treating a base glass for nucleation under a temperature within a range from 500° C. to 600° C. for one to seven hours and further heat treating the glass for crystallization under a temperature within a range from 700° C. to 780° C. for one to twelve hours.

14. A glass-ceramic substrate for a light filter using a glass-ceramic as defined in claim 1.

15. A light filter provided by forming a multi-layer film on a glass-ceramic as defined in claim 1.

* * * * *